May 21, 1935.  S. D. MOXLEY  2,002,411
APPARATUS FOR RELIEVING SHOCKS ON SCALES
Filed July 8, 1931  4 Sheets-Sheet 1
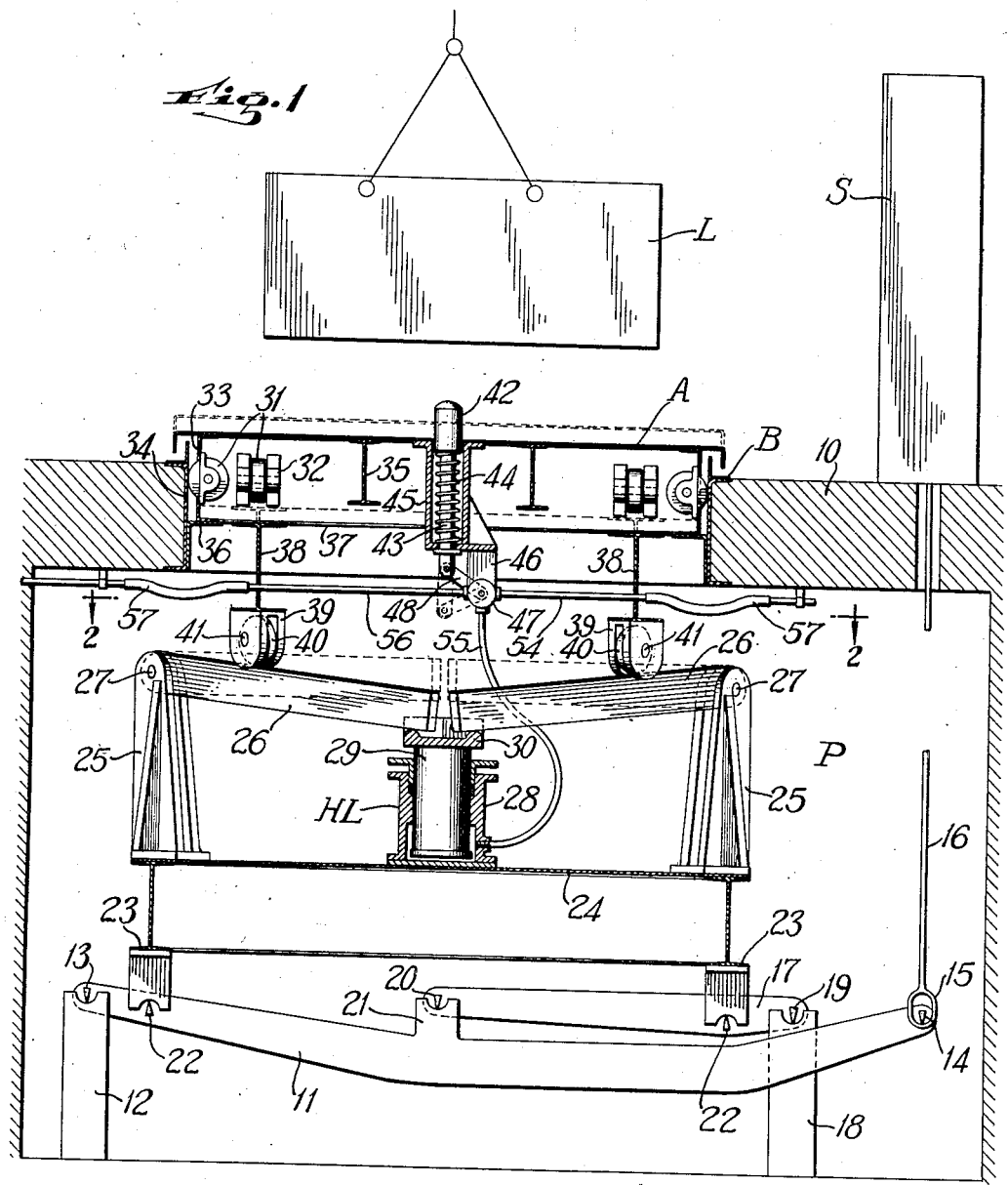
INVENTOR.
STEPHEN D. MOXLEY
BY Meyers + Jones
ATTORNEYS.

May 21, 1935.  S. D. MOXLEY  2,002,411
APPARATUS FOR RELIEVING SHOCKS ON SCALES
Filed July 8, 1931  4 Sheets-Sheet 2
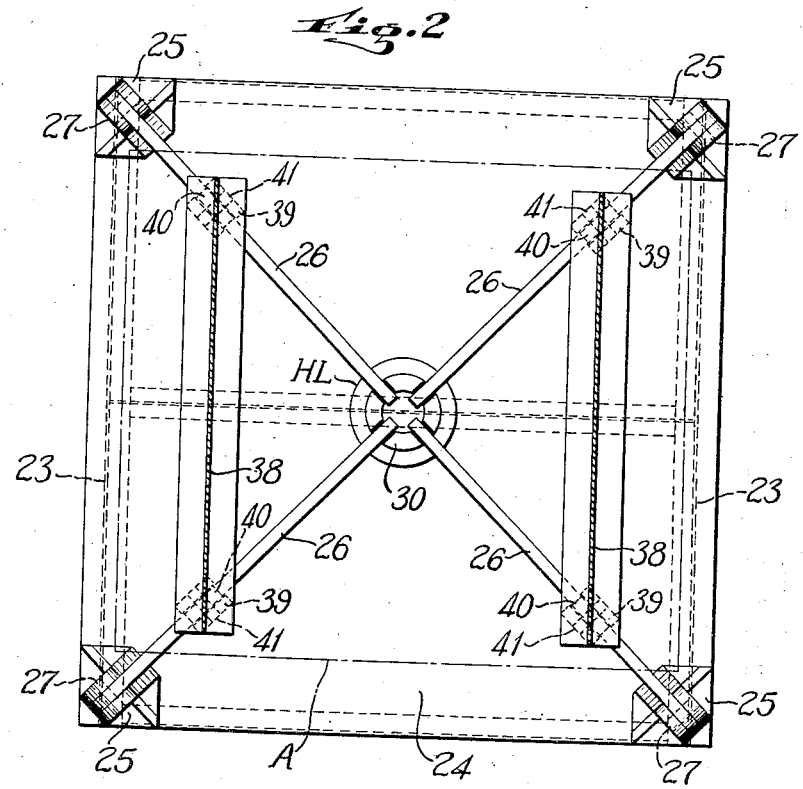
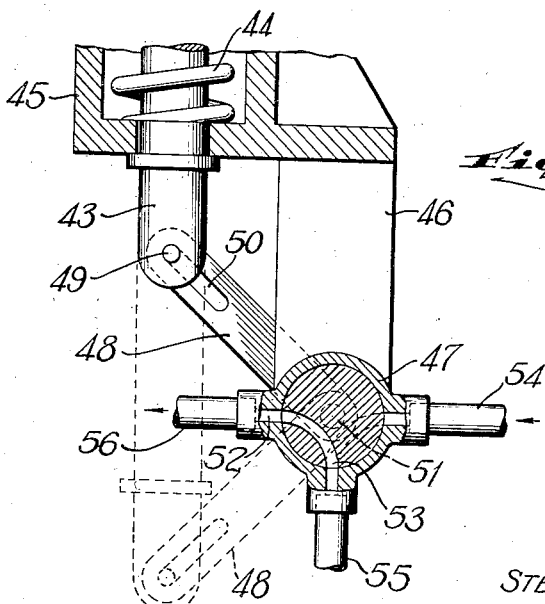
INVENTOR.
STEPHEN D. MOXLEY
BY Meyers & Jones
ATTORNEYS.

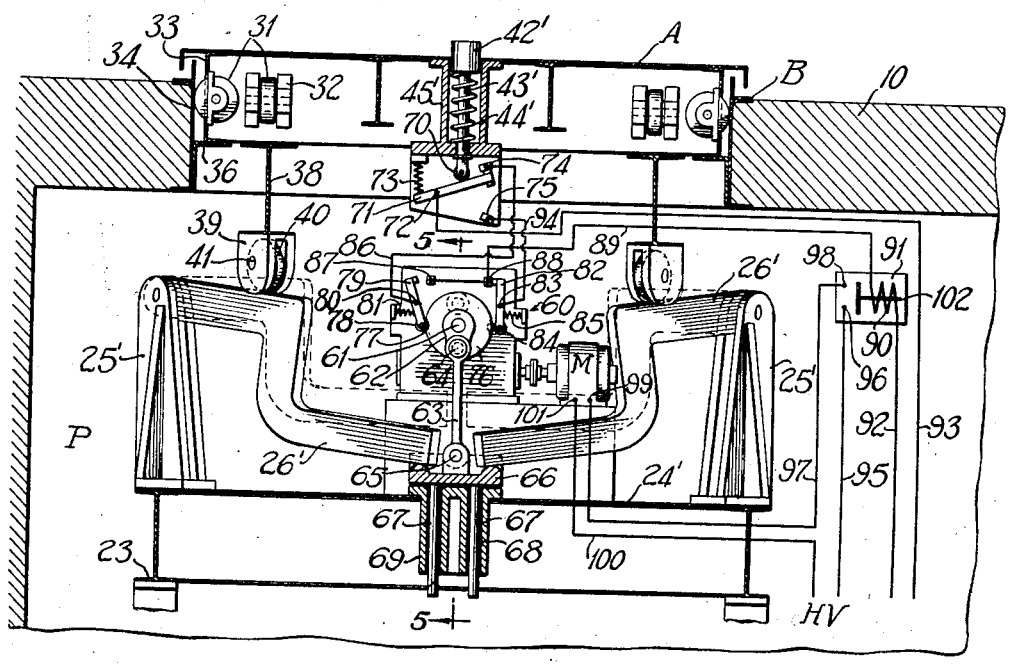
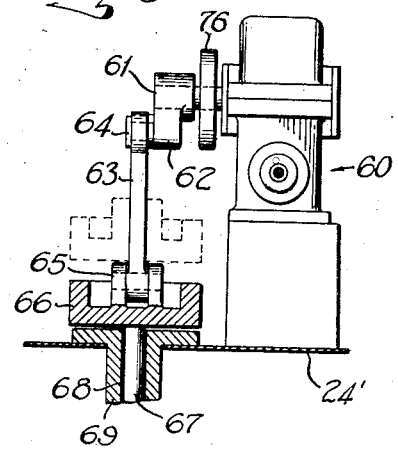

May 21, 1935.  S. D. MOXLEY  2,002,411
APPARATUS FOR RELIEVING SHOCKS ON SCALES
Filed July 8, 1931  4 Sheets-Sheet 4

INVENTOR.
STEPHEN D. MOXLEY
BY Meyers + Jones
ATTORNEYS.

Patented May 21, 1935

2,002,411

UNITED STATES PATENT OFFICE 2,002,411

APPARATUS FOR RELIEVING SHOCKS ON SCALES

Stephen D. Moxley, Birmingham, Ala., assignor to American Cast Iron Pipe Company, Birmingham, Ala., a corporation of Alabama Application July 8, 1931, Serial No. 549,475

21 Claims. (Cl. 265—72)

My invention relates to weighing scales and particularly to means for relieving the shock on the scale points, knife edges, beams, and other parts of standard scales during lowering and hoisting of the load to be weighed to and from the scale.

The invention comprises an apparatus constructed and arranged for application to standard scales, and although primarily intended for use where ponderous loads to be weighed are lowered to the scale platform by an overhead crane, lifting magnet, or other appliance, which by nature of the loading operation would normally subject the scale to considerable shock, the invention is applicable to and susceptible for use in connection with scales of various types and purposes.

The primary purpose of the invention is to provide a construction wherein the scale platform or member which receives the load is normally disposed and resting on a support constructed and designed to withstand heavy loads and shocks so that when the load is applied to the platform, the beams, knife edges, and other parts of the scale receive none of the shock. In connection with such an arrangement, it is a part of the primary purpose of the invention to provide means for transferring the weight of the load from the supporting or shock receiving structure to the weighing mechanism after the load has been deposited on the platform, the means for transferring the load to the weighing mechanism being set into operation automatically by the action of a member actuated by the load.

The foregoing purposes of the invention may be accomplished in several ways, that is, by a hydraulic medium acting to transfer the weight of the load from the supporting base to the weighing mechanism, by an electrical power medium operating for the same purpose, or by a combined electrical-hydraulic medium in which latter deposit of the load will close an electrical circuit to actuate an electrically operated hydraulic apparatus. Under any or all of the foregoing mediums, the mechanism is actuated to establish weighing relation between the load receiving platform and scale mechanism automatically after the structure normally supporting the platform has taken the shock of the load. Deposit of the load will actuate said mechanism to establish weighing relation between the platform and scale mechanism.

The foregoing and other objects and advantages of the invention will be discussed during the following detail description of the accompanying drawings, and the novel and useful features will be specifically pointed out.

In the accompanying drawings, Fig. 1, is a vertical sectional view through a scale support and mechanism embodying one form of the invention with parts in elevation;

Fig. 2, is a sectional view on the line 2—2 of Fig. 1;

Fig. 3, is an enlarged fragmentary sectional view of a valve and connection for operating mechanism;

Fig. 4, is a view similar to Fig. 1 showing a modification of the invention;

Fig. 5, is a view on the line 5—5 of Fig. 4;

Fig. 6, is a view similar to Figs. 1 and 4 showing another form of the invention; and Fig. 7, is a fragmentary view partly in section and partly in elevation showing a modified form of actuator applicable to all of the embodiments of the invention.

Referring to Figs. 1–3, A designates the load receiving platform, and B the shock receiving frame firmly grouted into or otherwise rigidly supported by the walls 10 of the pit P in which is located the scale mechanism and the mechanism for raising the platform A and load off of the frame B and gradually placing it on the scale mechanism which comprises a lever 11 fulcrumed at one end on the support 12, and carrying the knife edge 13 for engagement with the top of the support 12. At its other end the lever 11 is provided with a knife edge 14 which engages in the loop 15 on the rod 16 which is connected to the weight indicating mechanism of the scale S. A lever 17 is fulcrumed on the support 18, the lever carrying the knife edge 19 for engagement with the top of the support 18 and at its other end the lever 17 is provided with an edge 20 which engages the top of the projection 21 on the lever 11. Levers 11 and 17 are provided with knife edges 22 on which rest the beams 23. The arrangement of levers and knife edges just described is of standard and well known design and has been selected merely for the purpose of illustration, as the invention can be utilized in connection with scale mechanism of various other design and construction.

Beams 23 support a platform 24 on which are mounted the upright supports 25, arranged at the corners of the platform as shown clearly in Fig. 2. Each support 25 receives the end of a lever 26 which is pivoted to the support at 27 and the levers extend toward the center of the platform at which point is mounted the hydraulic lift HL comprising a cylinder 28 within which the piston 29 operates. The head 30 of the piston is engaged by the inner ends of the levers 26. Of course, the dead load of all of these parts can be backweighed in the scale leverage so as to balance on the scale dial and read zero, when the load is zero. This is common practice in scale manufacture and installation.

The platform A is shown as equipped with eight guiding rollers 31 which are mounted in brackets 32 on the beams 33 to engage against the side walls 34 of the frame B. These rollers prevent any side binding of the platform A against the frame B when the platform is raised and lowered in the manner hereinafter described.

In Fig. 1, the platform A is shown in full lines as supported on the flanges 36 carried by the side walls 34 of the frame B, and depending from the bottom 37 of the frame A are the beams 38, to the lower ends of which are secured brackets 39 within which the rollers 40 are pivotally mounted at 41, there being one bracket and roller for each of the levers 26. Each beam 38 is shown with two brackets attached thereto. When the frame A is resting on the flange 36, the rollers 40 do not engage with the levers 26 but there is a slight clearance between the rollers and levers so that the levers 11 and 17 do not bear any of the weight of the platform A and connected parts.

In order to raise the platform A from engagement with the frame B and establish it in weighing relation with the scale mechanism, I provide a plunger 42 on the rod 43, the plunger being normally biased to project above the top of the platform A by the spring 44 which engages the lower end of the plunger housing 45 and the head of the plunger 42. A depending bracket 46 carries a three-way operating valve 47 shown best in Fig. 3, the plug of which is connected by the link 48 to the lower end of the rod 43, the connection being made by a pin 49 on the rod and engageable in the slot 50 in the link 48. In Fig. 1 the load L is just above platform A and when this load is deposited on the platform, it will depress the plunger 42 so that the rod 43 will move down and move the link 48 to the dotted line position shown in Figs. 1–3 to operate the valve.

The valve plug is provided with a channel, the ends of which are indicated by the numerals 52 and 53. The valve connects with a fluid inlet pipe 54 leading from a source of fluid supply, not shown, and with a pipe 55 leading into the cylinder 28 of the hydraulic lift, and with a pipe 56 leading to a sewer or other waste receiving source. It will be noted that flexible connections 57 are interposed in the inlet and exhaust pipes.

The operation of the apparatus is as follows, and reference should be had to Figs. 1 and 3 where parts are shown in full line and dotted line positions, the full line position being that occupied by the parts when the platform A is resting on the frame B to take the load off of the scale mechanism, and the dotted line position being that occupied by the parts when the platform A and load has been raised off of the frame B. When the load L is deposited on the platform A it will engage the top of the plunger 42 and depress it so that the rod 43 will be moved downwardly and will move the link 48 to rotate the valve plug so that the end 52 of the valve passage will be placed in communication with the pipe 55 and the end 53 of the passage will be placed in communication with the inlet pipe 54, at which time fluid under predetermined pressure will be admitted to the cylinder 28 and will force the piston 29 upward so that the head 30 will carry the levers 26 up to the dotted line position shown in Fig. 1. As the levers 26 move upwardly they engage the rollers 40 and carry the brackets 39, beams 38, and platform A up to the dotted line position of Fig. 1 where the platform and load are above the frame B and the weight is supported on the levers 17 and 11 which move the rod 16 to actuate the scale mechanism to indicate the weight of the load. When the reading has been taken, the load is lifted from the platform A and the plunger 42 is moved upwardly again by the spring 44. It will be obvious that the rod 43 will carry the link 50 upwardly to rotate the valve plug so that the openings 52 and 53 of the valve passage will be moved to the full line position of Fig. 3 in communication with the exhaust pipe 56 and the pipe 55 respectively, and as the platform A descends, the beams 38 and rollers 40 move the levers 26 downwardly so that the piston 29 is depressed in casing 28 forcing the fluid out through pipes 55 and 56. The flexible connections 57 permit movement of the inlet and exhaust pipes with the platform, and of course the pipe 55 is flexible.

Referring to Figs. 4–5, of the drawings, the embodiment of the invention there shown is substantially the same as that shown in Figs. 1–3 differing therefrom only in the means for raising and lowering the load receiving platform A, as there might be instances where it would be highly desirable to use electric power instead of the hydraulic medium.

A motor M is mounted on the platform 24', which, it will be understood, is disposed on the weighing beams as disclosed in Fig. 1. The motor is operatively connected with and drives a worm-gear speed reducer 60 which may be of any standard construction. On the shaft 61 is mounted a crank 62 to which the link 63 is pivotally connected at 64, and the other end of the link 63 is connected at 65 to a lifting member 66, the arms 67 of which have guided movement in the openings 68 in the support 69 mounted on the platform 24'. The levers 26' are mounted on the supports 25' as disclosed in connection with Figs. 1–3, but in this embodiment of the invention, the levers 26' are shown as being offset at their lower ends which engage the top of the lifting member 66 which corresponds to the head 30 of the piston 29 in Fig. 1. It will be understood that the function of the guide openings 68 is merely to restrict the movement of the lifting member 66 to a straight line vertical motion, notwithstanding the angles assumed by the connecting link 63 during movement of the crank 62 in a manner about to be described.

When the motor operates the speed reducer 60, the crank 62 revolves and lifts the member 66 and with it the levers 26', thus obtaining the same movement of the platform A as described in connection with the hydraulic operation disclosed in Figs. 1–3.

The electric operation is automatically effected and controlled through the medium of electrical circuits actuated by the plunger 42' as follows. The plunger is normally held above the top of the platform A by means of the spring 44' mounted in the housing 45' around the rod 43' in the lower end of which is journaled a roller 70 for engagement with the switch 71 which is pivoted at 72 and normally biased by the spring 73 to the position shown in Fig. 4 where one terminal of the switch is in contact with an electric circuit terminal 74. A disc 76 is carried on the shaft 61 for rotation therewith, and the disc has provided on its outer periphery a depression 77 in which the roller 78, which is journaled at one end of the switch 79 pivoted at 80, is normally held under the action of the spring 81 which urges the lower end of the switch to the full line position shown in Fig. 4. A similar switch 82 is mounted on the opposite side of the disc 76 and is pivoted at 83 so that the roller 84 journaled in its lower end will engage in the depression 77 when the disc has been rotated 180° to the dotted line position shown in Fig. 4, it being understood that the spring 85 will move the switch about its pivot 83 to force the roller into the depression. The depression assumes the dotted line position shown in Fig. 4 when the crank 62 has rotated to the dotted line position at which time the member 66 has been raised to its fullest extent.

The terminal 74 is connected by the wire 86 to the switch 81, which is adapted to contact the terminal 87 connected to the terminal 88 which is connected by the wire 89 with the coil 90 of the relay 91, the coil being connected by the wire 92 to a source of power, not shown. A wire 93 also connects said source of power with the switch 71. The terminal 75 is connected by the wire 94 with the switch 82.

The foregoing circuits are operable by the working parts of the apparatus to make and break the high voltage circuit HV which comprises a wire 95 connected with the terminal 96 of the relay and with a source of power, not shown. The wire 97 is connected with a terminal 98 of the relay and with the terminal 99 of the motor M. The high voltage circuit is completed by the wire 100 connected to the terminal 101 of the motor and with the source of power.

The operation of the apparatus and the lifting mechanism is as follows. When the load is placed on the platform A and depresses the plunger 42', the switch 71 is moved down by the roller 70 until it contacts the terminal 75, at which time the electricity flows through wire 93, switch 71, terminal 75, wire 94, switch 82, terminal 88, wire 89, and coil 90, which is energized to move the armature 102 into contact with the terminals 96 and 98 of the relay which completes the high voltage circuit through wires 95, armature 102, wire 97, through the motor and the wire 100, thus causing the motor to rotate the crank 62 and the disc 76 lifting the roller 78 out of the depression 77 and forcing the terminal of the switch 79 into contact with the terminal 87. When the crank and disc have rotated 180° to the dotted line positions shown in Fig. 4, the roller 84 will fall into the depression 77 under the action of the spring 85 and will break the connection at the terminal 88 from which the wire 89 leads to the coil 90 so that the coil will be de-energized. When the coil is de-energized, the armature 102 is moved from contact with the terminals 96 and 98 and the operation of the motor is stopped. At this point, the crank 62 is in the up position and the levers 26' have been raised making contact with the rollers 40, and raising the platform A along with the load and establishing it in weighing relation with the scale mechanism, as described in connection with Fig. 1.

After the load is weighed it is moved from the platform A and the spring 44' immediately raises the plunger 42' which releases the switch 71 from contact with the terminal 75, the spring 73 forcing the switch into contact with terminal 74 and again establishing a circuit through the terminal 74, wire 86, switch 79, terminals 87 and 88 and wire 89, through the coil, wire 92, wire 93 and switch 71, so that the armature is moved to close the high voltage circuit and again operate the motor in the same direction whereby the crank moves in a downward direction forcing the link 63 and member 66 downward until the full line position of Fig. 4 is re-established, at which time the roller 78 will be seated in the depression 77 and the switch 79 will be moved from contact with the terminal 87.

Referring to Fig. 6 of the drawings, platform A, support B, levers 26, platform 24, and the lifting rollers and beams 38 are arranged as shown in Fig. 1. Fig. 6 illustrates how it is possible to lift the platform A by an electrically operated hydraulic lift T. The platform A carries the housing 44' through which projects the plunger 42" to which is connected the roller 70' to operate a switch S similar to the switch 71 described in connection with Fig. 4. The switch S is electrically connected at 105 through the wire 106 to the coil 107 which is also connected by the wire 108 to a source of power, not shown. A wire 109 connects said source of power with the terminal 110 which the switch contacts when depressed by the plunger 42" to complete the circuit through the coil to energize the armature 111 to close a circuit through wire 112 across the terminals 113 and 114 and with wire 115 connected to the motor at 116. The terminal 117 of the motor is also connected to the source of power by wire 117'.

An electrically operated hydraulic lift T is of a well known construction and when the circuit is completed through the motor, the centrifugal impellor 118 is rotated by the shaft 119 to pump oil from the top of the cylinder through to the bottom side of the piston 120 which carries the rods 121 connected to the lifting head 30' on which rest the levers 26.

It should be obvious under this construction that when the plunger 42" is depressed by the load to be weighed, a circuit is closed through the coil of the relay which establishes a closed circuit to the motor and that when the load is removed and the plunger 42" is returned to the position shown in Fig. 1, the coil is de-energized and the circuit through the motor is broken and the head 30' comes to rest in its normally lowered position. It will be understood without further description that the operation of the levers 26, rollers 40, beams 38 and platform A is identical with the operation of the same parts as described in connection with Fig. 1.

In all embodiments of the invention the load receiving platform is normally out of weighing relation with the scale mechanism and is established in weighing relation with the scale only after the shock of the load has been taken by the frame B and its support. The deposit and removal of the load actuates the apparatus thus removing the human element and increasing the efficiency and practicability of the apparatus and invention.

The actuating plunger 42, 42' can be made of any desired shape to suit the particular material to be weighed, and in Fig. 7, I have shown a plate 42A mounted on top of the plunger for use in weighing loose material.

It should be obvious that in each embodiment of the invention it is possible to readily utilize the apparatus with manual control of the lifting and lowering mechanism. In the case of the hydraulic lift in Figs. 1–3, the valve 47 for controlling the flow of fluid could be placed near the scale or remote therefrom with suitable connection to the sources of supply, exhaust and the cylinder with provision of a hand operated lever or handle similar to 48 for operating the valve. In the case of the electrically actuated mechanism of Figs. 4–6 a switch or push button could be connected with the circuits, as shown and described, but mounted at any point adjacent or remote from the mechanism for manual operation. In other words, it would be necessary only to change the location of the actuating part by removing it from the platform and placing it on any suitable support at any desired location.

I claim:—

1. Apparatus of the character described comprising a movable load receiving platform, weighing mechanism, a support for holding said platform out of weighing relation with the weighing mechanism, a member positioned for movement by the load as the load is deposited on the platform, and mechanism supported by the weighing mechanism and operable by said member to establish the platform in weighing relation with the weighing mechanism.

2. In combination with a weighing scale, a support carried by the mechanism of the weighing scale, levers mounted on said support, a movable load receiving platform, a support on which the platform normally rests in load receiving position, members extending from said movable platform to within proximity of the levers for engagement thereby, said members and levers being out of engagement when the platform is resting on its support, and means operable by the deposit of a load on the platform for moving said levers into engagement with said members to move the platform and load from its support and establish the platform and load in weighing relation with the weighing mechanism.

3. The structure of claim 2 wherein said means for operating the levers comprises a movable member carried by the platform in position for engagement by the load, a lifting device engageable with the levers, and an operating medium for said lifting device actuated by movement of said movable member when the load is deposited.

4. In combination with a weighing scale, apparatus for relieving the shock on the weighing mechanism when the load to be weighed is deposited and removed comprising a load receiving platform, a support for said platform upon which the platform normally rests, an operating member mounted through the platform and projecting thereabove in position for engagement by the load, a plurality of rollers carried by the platform, a plurality of levers for engagement with said rollers, a support for said levers associated with the weighing mechanism, and means operable by said operating member upon deposit of the load to actuate said levers to engage said rollers to raise the platform from its rigid support and to establish said platform and load in weighing relation to the weighing mechanism.

5. The structure of claim 4 wherein said operating member operates said means to effect return of the platform to its support in disconnected relation to said weighing mechanism upon removal of the load from the platform.

6. In apparatus of the character described, a load receiving platform, a rigid support upon which the platform normally rests, said support being a part of an enclosure for weighing mechanism, lifting mechanism within said enclosure below said platform and supported by the weighing mechanism, means between said platform and lifting mechanism automatically operable by deposit of the load to be weighed on the platform to remove the platform from its support and establish it and the load in weighing relation with the weighing mechanism.

7. Apparatus for preventing shock to the mechanism of weighing scales, comprising a movable load receiving platform, a support normally holding said platform out of weighing relation with the scale mechanism, means for lifting said platform from said support and establishing it in weighing relation with the scale mechanism, a hydraulic lift for operating said means, a three way operating valve connected with said hydraulic lift, and means operable by deposit and removal of the load for operating said valve to actuate said lift to raise the platform from said support after deposit of the load and to lower it onto said support after removal of the load.

8. Apparatus for preventing shock to the mechanism of weighing scales, comprising a movable load receiving platform, a support normally holding said platform out of weighing relation with the scale mechanism, levers carried on the scale mechanism, hydraulically operated lifting mechanism for operating said levers to raise and lower the load receiving platform, a valve for operating said lifting mechanism carried by the load receiving platform, a member for operating said valve movably mounted on the platform and operable by deposit and removal of the load to operate said valve and lifting mechanism.

9. The structure of claim 8 wherein the load receiving platform carries anti-friction elements for engagement by the levers and anti-friction elements for engagement with its support during movement of the platform.

10. Apparatus for preventing shock to the mechanism of weighing scales, comprising a movable load receiving platform, a support normally holding said platform out of weighing relation with the scale mechanism, means for lifting said platform from said support and establishing it in weighing relation with the scale mechanism, electrically driven power apparatus for actuating said means, an electric power circuit connected to said apparatus, pilot circuits for closing and opening said power circuits, means operable by deposit of the load to close one pilot circuit to close the power circuit, and means operable by said power apparatus to open said pilot and power circuits when the platform and load are established in weighing relation with the scale mechanism.

11. Apparatus for preventing shock to the mechanism of weighing scales, comprising a movable load receiving platform, a support normally holding said platform out of weighing relation with the scale mechanism, means for lifting said platform from said support and establishing it in weighing relation with the scale mechanism, electrically driven power apparatus for actuating said means, an electric power circuit connected to said apparatus, pilot circuits for closing and opening said power circuit, a plurality of switches connected in said pilot circuits, one of said switches being operable by deposit and removal of the load and the others being operable by the power apparatus to close the power circuit upon deposit of the load and to close said circuit when the load and platform are in weighing relation with the scale mechanism and to again close the power circuit when the load is removed from the platform.

12. Apparatus for preventing shock to the mechanism of weighing scales, comprising a movable load receiving platform, a support normally holding said platform out of weighing relation with the scale mechanism, means for lifting said platform from said support and establishing it in weighing relation with the scale mechanism, an electrically driven lifting mechanism for engaging said means to raise and lower the platform, an electric power circuit for actuating said electrically driven lifting means, pilot circuits, a switch in said pilot circuit connected to a source of electrical energy and operable by the load to alternately contact two terminals of the pilot circuits, a pair of switches connected respectively to said terminals, a pair of terminals in the pilot circuits for contact by said second switches, a relay connected to said second terminals to open and close the power circuit, and a member operable by the electrically driven lifting mechanism and engageable with said second switches to open the power circuit when the load and platform are established in weighing relation with the scale mechanism and to close the power circuit when the load is removed from the platform to cause the lifting mechanism to lower the platform.

13. Apparatus for preventing shock to the mechanism of weighing scales, comprising a movable load receiving platform, a support normally holding said platform out of weighing relation with the scale mechanism, means for lifting said platform from said support to establish it in weighing relation with the scale mechanism and to lower it on to its support, an electrically operated hydraulic lift for operating said means, an electric power circuit connected to said hydraulic lift and to a source of electric power, a pilot circuit for opening and closing said power circuit, and a switch operable by deposit of the load to close said pilot circuit and operable by removal of the load to open said pilot circuit to close and open the power circuit.

14. In combination with a weighing scale, a support carried by the mechanism of the weighing scale, levers mounted on said support, a load receiving platform, a support on which the platform normally rests in load receiving position, members extending from said platform to within proximity of the levers for engagement thereby, said members and levers being out of engagement when the platform is resting on its support, means for moving said levers into engagement with said members to move the platform and load from its support into weighing relation with the weighing mechanism, and means for actuating said first means.

15. In combination with a weighing scale, apparatus for relieving the shock on the weighing mechanism upon deposit and removal of a load to be weighed comprising, a load receiving platform, a support for said platform upon which it normally rests in load receiving position and out of weighing relation with said mechanism, members carried by said platform, levers for engaging said members to raise and lower the platform from and to said support, a support for said levers associated with the weighing mechanism, means to move said levers and members to raise and lower the platform, and means for actuating said first means.

16. In combination with a weighing scale, a load receiving platform, a support on which the platform normally rests in load receiving position, means for establishing said platform in weighing relation with the weighing mechanism of the scale, a member extending above the surface of the platform for actuating said means, and an enlargement on said member in spaced relation to the platform to receive a portion of the load to cause movement of said member to actuate said means.

17. Apparatus for preventing shock to the mechanism of a weighing scale, comprising a movable load receiving platform, means to support the platform in lowered load receiving position out of weighing relation with said mechanism, and means supported by the scale to raise said platform from said support to establish the platform in weighing relation with the weighing mechanism, and means actuated by deposit of the load on the platform to automatically effect operation of said means to elevate the platform.

18. Apparatus for preventing shock to the mechanism of a weighing scale, comprising a movable platform, means normally supporting said platform in lowered position and out of weighing relation with said mechanism, means supported by the scale to raise said platform from said support and establish it in weighing relation with said mechanism, and electrically controlled means for actuating said second means.

19. The structure of claim 18 wherein said electrically controlled means actuates said second means to restore the platform to its normal position on said first means upon removal of the load.

20. Apparatus for preventing shock to the mechanism of weighing scales, comprising a movable load receiving platform, a support normally holding said platform out of weighing relation with the scale mechanism, means for lifting said platform from said support and establishing it in weighing relation with the scale mechanism, electrically driven power apparatus for actuating said means, an electric power circuit connected to said apparatus, pilot circuits for closing and opening said power circuits, means operable to close one pilot circuit to close the power circuit, and means operable by said power apparatus to open said pilot and power circuits when the platform and load are established in weighing relation with the scale mechanism.

21. Apparatus for preventing shock to the mechanism of a weighing scale, comprising a movable load receiving platform, means to support the platform in lowered load receiving position out of weighing relation with said mechanism, means supported by the scale to raise said platform from said support to establish the platform in weighing relation with the weighing mechanism and also operable to restore the platform to load receiving position on said first means, and means operable by deposit and removal of the load to actuate said second means.

STEPHEN D. MOXLEY.